US006461027B1

(12) United States Patent
Yagi et al.

(10) Patent No.: US 6,461,027 B1
(45) Date of Patent: Oct. 8, 2002

(54) REAR COMBINATION LAMP

(75) Inventors: Sakai Yagi; Takeshi Koyama, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/609,244

(22) Filed: Jun. 30, 2000

(30) Foreign Application Priority Data

Jul. 2, 1999 (JP) .......................................... 11-189260

(51) Int. Cl.[7] .................................................. B60Q 1/00

(52) U.S. Cl. ....................... 362/505; 362/226; 362/548; 362/549; 439/949

(58) Field of Search ................................ 362/226, 548, 362/549, 505; 439/699.2, 699.1, 949

(56) References Cited

U.S. PATENT DOCUMENTS

| | | | | |
|---|---|---|---|---|
| 3,604,919 A | | 9/1971 | MacPherson | 240/8.16 |
| 4,040,709 A | | 8/1977 | Dola et al. | 339/125 L |
| 4,246,632 A | | 1/1981 | Hancox | 362/382 |
| 4,264,117 A | | 4/1981 | Pritulsky | 339/97 L |
| 4,303,297 A | | 12/1981 | Smart et al. | 339/218 M |
| 5,121,310 A | | 6/1992 | Ahroni | 362/238 |
| 5,464,352 A | | 11/1995 | Van Emmerick | 439/404 |
| 5,529,535 A | | 6/1996 | Forish | 439/56 |
| 5,536,174 A | | 7/1996 | Forish | 439/57 |
| 5,647,761 A | | 7/1997 | Kaminski | 439/419 |
| 5,709,566 A | | 1/1998 | Tsuji et al. | 439/397 |
| 5,797,766 A | | 8/1998 | Tanigawa | 439/419 |
| 5,823,816 A | | 10/1998 | Uchida et al. | 439/419 |
| 5,853,299 A | | 12/1998 | Wu | 439/419 |
| 5,879,186 A | * | 3/1999 | Harada | 439/549 |
| 5,893,774 A | | 4/1999 | Lin | 439/419 |
| 5,941,633 A | | 8/1999 | Saito et al. | 362/543 |
| 6,083,012 A | * | 7/2000 | Suzuki et al. | 439/57 |

FOREIGN PATENT DOCUMENTS

| | | | |
|---|---|---|---|
| JP | 1-164606 | 11/1989 | F21Q/1/00 |
| JP | 3-20979 | 1/1991 | H01R/33/46 |
| JP | 6-11206 | 2/1994 | F21Q/1/00 |
| JP | 6-275117 | 9/1994 | F21V/19/00 |
| JP | 6-309934 | 11/1994 | H01B/7/00 |
| JP | 11-144505 | 5/1999 | F21Q/1/00 |
| JP | 11-167938 | 6/1999 | H01R/4/24 |

OTHER PUBLICATIONS

Patent Abstracts of Japan 06309934A Nov. 4, 1994.
Patent Abstracts of Japan 06275117 Sep. 30, 1994.

* cited by examiner

*Primary Examiner*—Stephen Husar
*Assistant Examiner*—Bertrand Zeade
(74) *Attorney, Agent, or Firm*—Sughrue Mion, PLLC

(57) ABSTRACT

A plate-like member (8) and three lamp sockets (15, 25, 35) are mounted onto a lamp body (2) to form a rear combination lamp (1). The plate-like member (8) is formed by two thermoplastic resin sheets (9*a*, 9*b*) having a hot-melt adhesive therebetween, which are adhesively bonded together, while wire-like conductors (W1, W2, W3, G) are sandwiched therebetween. The plate-like member (8) has three holes (10), and notches (11) are formed in a peripheral edge of each hole (10). Predetermined portions of the conductors (W1, W2, W3, G), which are held between the sheets (9*a*, 9*b*), are exposed at the notches (11), respectively. Each of the lamp sockets (15, 25, 35) includes a socket body (16, 26, 36) for receiving connection terminals, and a flange (17, 27, 37). A conductor contact portion of each of the connection terminals projects from the associated flange (17, 27, 37), and is abutted against the associated conductor (W1, W2, W3, G).

23 Claims, 13 Drawing Sheets

REAR COMBINATION LAMP

BACKGROUND OF THE INVENTION

1. Field of the Invention

The present invention relates to a rear combination lamp that is mounted on a vehicle such as an automobile. Particularly, the present invention relates to a rear combination lamp suitable for an automated assembling operation.

The present application is based on Japanese Patent Application No. Hei. 11-189260, which is incorporated herein by reference.

2. Description of the Related Art

Various techniques of rear combination lamps have heretofore been known, and a rear combination lamp of the common type will be described with reference to FIG. 16 which is a schematic view thereof.

As shown in FIG. 16, external wires W0 are connected to the conventional rear combination lamp 100 via connectors C, and this lamp 100 includes four lamp sockets 101*a* to 101*d*. A turn lamp is inserted in the first lamp socket 101*a*, a tail-stop lamp is inserted in the second lamp socket 110*b*, a parking-stop lamp is inserted in the third lamp socket 101*c*, and a back lamp is inserted in the fourth lamp socket 101*d*.

Branch wires, branching from a common grounding wire G, are connected to minus electrode 102 of the four lamp sockets 101*a* to 101*d*, respectively.

Branch wires, branching from a common wire W, are connected respectively to plus electrodes of the lamp sockets 101*b* and 101*c* so that the lamps (stop lamps), held respectively in these lamp sockets, can be lighted at the same time.

By thus effecting the branch connections of the common wires, the numbers of the external wires, connected to the rear combination lamp, can be reduced. Therefore, a total of ten wires are connected to the electrodes of the lamp sockets 101*a* to 101*d*.

In a conventional method of effecting a branch connection of a common wire, a sheath of the common wire is removed intermediate opposite ends thereof, and a sheath of another wire is removed at its end portion, and exposed portions of conductors of these wires are compressively connected together by the use of a metal piece. In this case, it is necessary to insulate the compressively-connected portion, for example, by winding a tape therearound. There is known another method in which a branch connection of a wire is effected using a joint connector.

Unexamined Japanese Utility Model Publication No. Hei. 1-164606 discloses a wire routing structure in a rear combination lamp as shown in FIG. 17. In this rear combination lamp, a wire 121, connected to lamp sockets 120*a* and 120*b*, is passed through a protective pipe 122, and this protective pipe 122 is retainingly engaged in a notch 125 formed in a horizontal rib 124 formed on a lamp body 123. With this construction, the wire 121 of a sufficient length is prevented from being cut by a metal edge portion 126 of a vehicle body upon contact therewith.

In the above conventional rear combination lamps, however, the operation for effecting the branch connection of the wire, as well as the operation for installing the wire, has been cumbersome, and besides it has been difficult to automate these operations, and therefore there has been encountered a problem that the cost has increased.

SUMMARY OF THE INVENTION

With the above problems in view, it is an object of the present invention to provide a rear combination lamp which enables the connection of wires to be effected easily and positively, and is suitable for an automated assembling operation.

To achieve the above object, according to the first aspect of the present invention, there is provided a rear combination lamp which comprises a lamp, a lamp socket holding the lamp, the lamp socket including a plurality of connection terminals which are electrically connected to the lamp, a plurality of conductor contact portions respectively formed on the connection terminals, a lamp body, comprising at least one socket mounting portion including a socket mounting opening, which is formed in a rear side of the socket mounting portion, and in which the lamp socket is detachably mounted, and a plate-like member including a hole corresponding to the socket mounting opening, the plate-like member being mounted on the lamp body, the plate-like member having a plurality of conductors mounted therein, wherein the lamp socket is mounted in the socket mounting opening through the hole of the plate-like member so that the conductor contact portions of the connection terminals are electrically connected respectively to the conductors of the plate-like member.

In the rear combination lamp of the above construction, the conductors are mounted in a flat manner in the plate-like member, and therefore the conductor-mounting operation can be easily automated, and also branch connections of the conductors can be easily effected. Since the conductors are mounted in the plate-like member, a wire installation operation is not necessary, and therefore the assembling operation of the rear combination lamp is simplified, and this assembling operation can be easily automated.

According to the second aspect of the present invention, it is preferable that the plate-like member is so shaped as to be fitted on at least part of the lamp body. With this construction, an operation for mounting the plate-like member on the lamp body can be effected easily and positively.

According to the third aspect of the present invention, it is preferable that the plate-like member comprises a thermoplastic resin sheet having a hot-melt adhesive. With this construction, in a heated condition of this thermoplastic resin sheet, an operation for adhesively fixing the conductors to the sheet and an operation for forming the sheet into such a shape as to be fitted on at least part of the lamp body can be effected at the same time, and therefore the productivity can be enhanced. Based on the third aspect of the present invention, preferably, the plate-like member may comprise two thermoplastic resin sheets having a hot-melt adhesive therebetween. In this case, the thermoplastic resin sheets are adhesively bonded together while the conductors are sandwiched therebetween.

According to the fourth aspect of the present invention, it is preferable that the lamp socket includes a socket body receiving the connection terminals, and a flange, wherein the conductor contact portions of the connection terminals have resiliency, and project from the flange, and wherein when the lamp socket is mounted in the socket mounting opening, the conductor contact portions are abutted respectively against the conductors. With this construction, when the lamp socket is mounted on the lamp body through the hole of the plate-like member, the conductor contact portions of the connection terminals are automatically abutted respectively against the conductors of the plate-like member, and therefore the efficiency of the assembling operation can be enhanced.

Further, according to the fifth aspect of the present invention, it is preferable that the socket mounting portion is formed as a shaped surface of the lamp body, and wherein the plate-like member is so shaped as to cover the socket mounting portion.

Furthermore, according to the sixth aspect of the present invention, it is preferable that the conductors are partially exposed at notches which are formed in the plate-like member, so that the conductor contact portions of the connection terminals are electrically connected respectively to partially-exposed portions of the conductors at the notches of the plate-like member when the lamp socket is mounted in the socket mounting opening.

DETAILED DESCRIPTION OF THE PREFERRED EMBODIMENT

One preferred embodiment of a rear combination lamp of the present invention will now be described in detail with reference to FIGS. 1 to 15.

Figure 1:
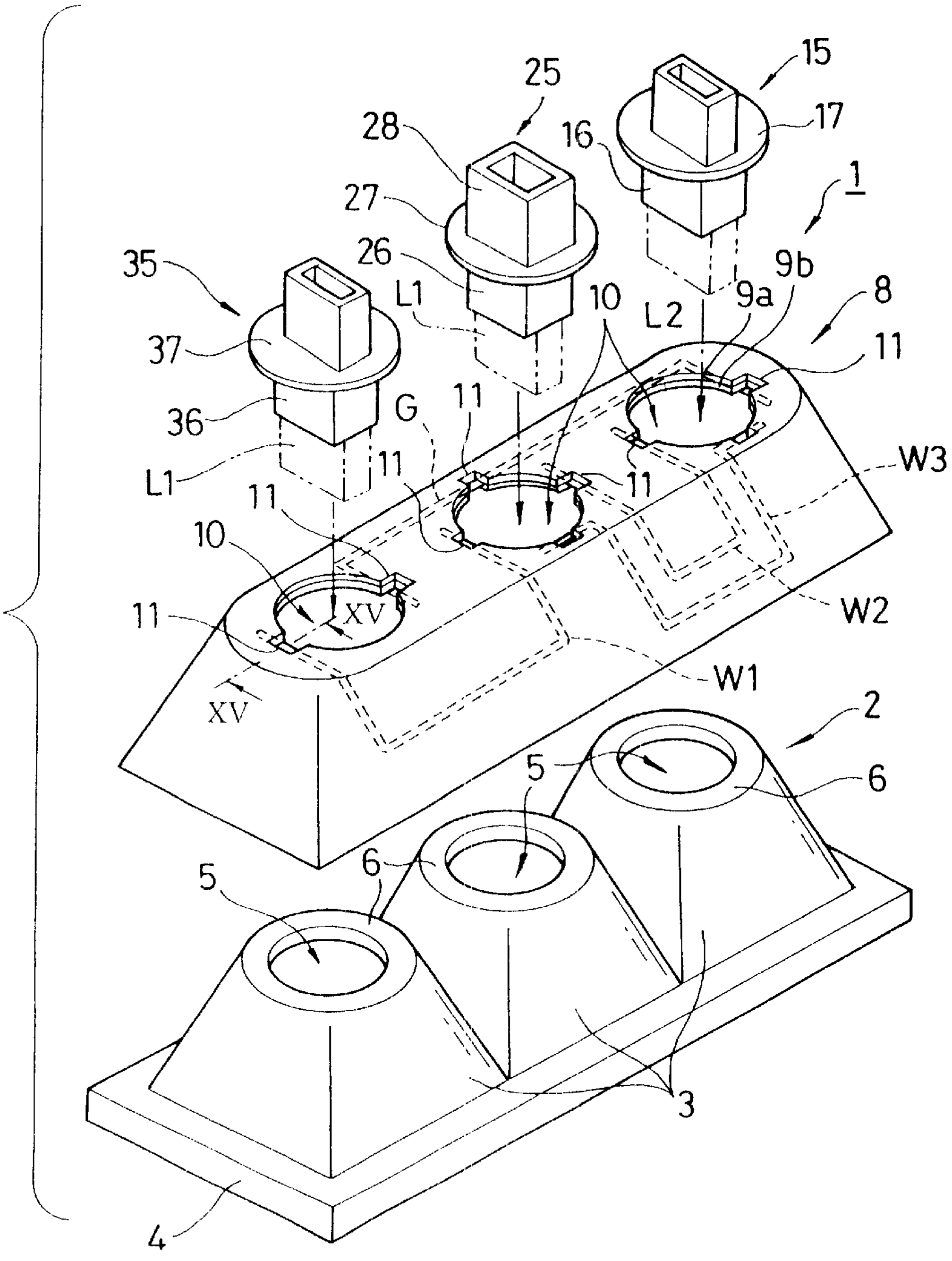
FIG. 1 is an exploded, perspective view of one preferred embodiment of a rear combination lamp of the present invention.

As shown in FIG. 1, the rear combination lamp 1 of this embodiment includes a plate-like member 8, a double-filament lamp socket 15, and two single-filament lamp sockets 25 and 35, and these parts are mounted on a lamp body 2.

The lamp body 2 includes three socket mounting portions 3, each having a socket mounting opening 5 at a rear portion thereof, and a lens portion 4 which closes front openings of the socket mounting portions 3 in a sealed manner. The lamp sockets 15, 25 and 35 are mounted respectively in the socket mounting openings 5 of the three socket mounting portions 3, and a reflecting mirror (not shown) is formed on an inner surface of each of the socket mounting portions 3.

The plate-like member 8, which forms an important constituent element of this embodiment, comprises two thermoplastic resin sheets (hereinafter referred to as "hot-melt sheets) 9*a* and 9*b* each having a hot-melt adhesive coated thereon, and the two hot-melt sheets 9*a* and 9*b* are adhesively bonded together, with wire-like conductors W1, W2, W3 and G (each having no sheath) sandwiched therebetween. The plate-like member 8 has three holes 10 slightly larger in diameter than each socket mounting opening 5 in the lamp body 2, and notches 11 are formed respectively in predetermined portions of a peripheral edge of each hole 10. Predetermined portions of the conductors W1, W2, W3 and G are exposed at these notches 11, respectively. The conductor G serves as a grounding wire.

Figure 2:
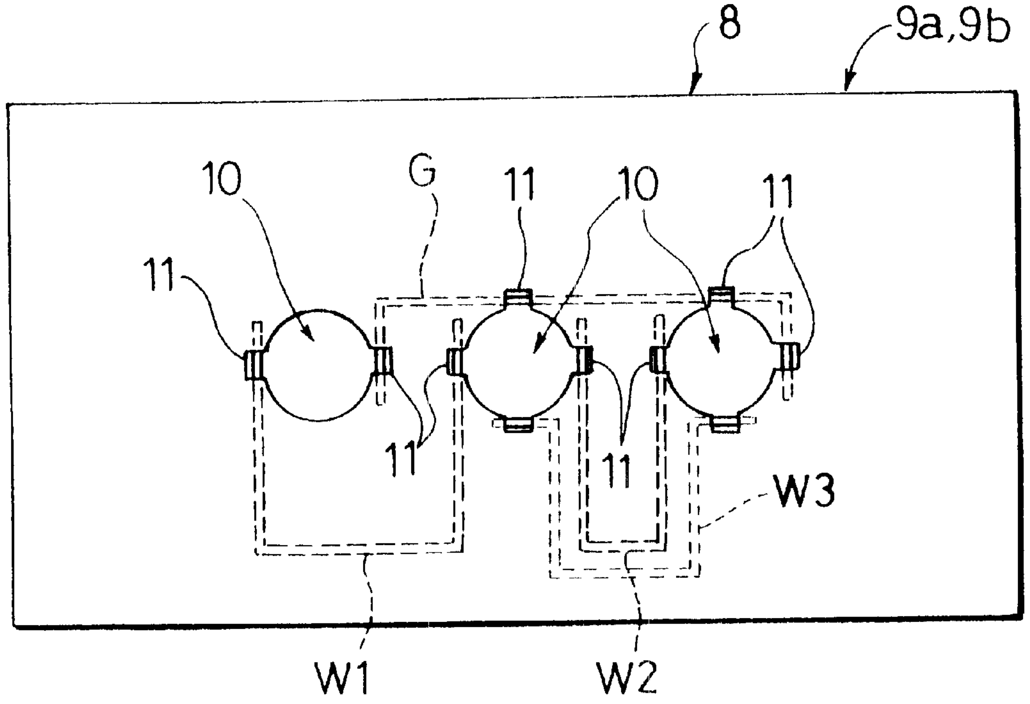
FIG. 2 is a plan view of a plate-like member of FIG. 1, showing a condition before it is formed into a predetermined shape.

For forming the plate-like member 8, the conductors W1, W2, W3 and G are laid on the adhesive-coated surface of the flat hot-melt sheet 9*a*, and then the other hot-melt sheet 9*b* is superposed on the hot-melt sheet 9*b*, with its adhesive-coated surface facing downwardly, as shown in FIG. 2. Then, the hot-melt sheets 9*a* and 9*b*, thus superposed together, are heated, and then are subjected to vacuum forming, so that the conductors W1, W2, W3 and G are adhesively fixedly held between the two hot-melt sheets 9*a* and 9*b*, and at this time, the hot-melt sheets 9*a* and 9*b* are shaped into such a configuration as to be fitted on the socket mounting portions 3 of the lamp body 2 shown in FIG. 1.

Figure 3:
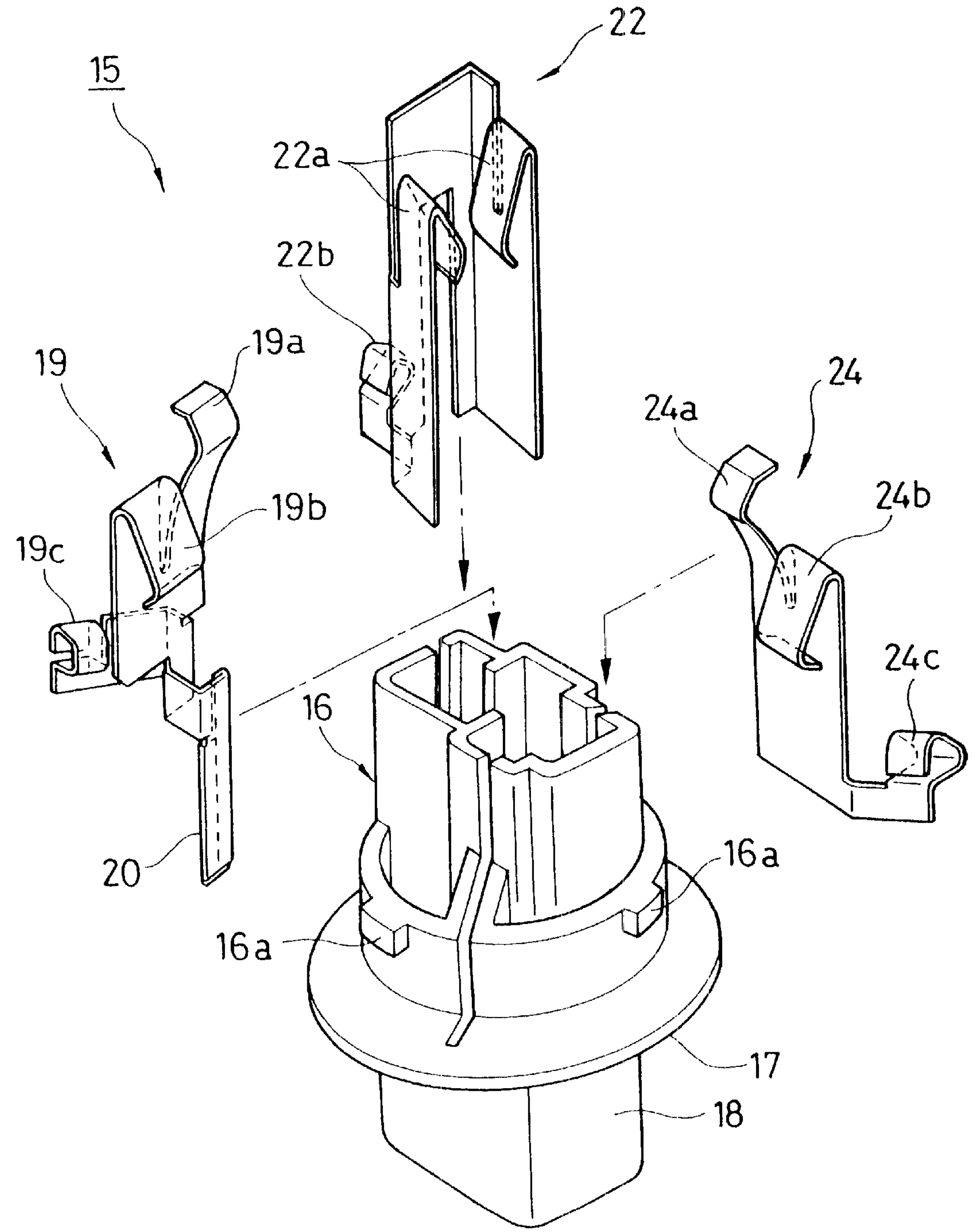
FIG. 3 is an exploded, perspective view of a first lamp socket in FIG. 1.

Next, the structure of the lamp sockets 15, 25 and 35 of this embodiment will be described with reference to FIGS. 3 and 4. As shown in FIG. 3, the first lamp socket 15 is mounted on the right-hand one among the three socket mounting portions 3 shown in FIG. 1, and a lamp L2, having two filaments, is inserted into this first lamp socket 15. This lamp L2 serves as a tail-stop lamp.

This lamp socket 15 includes a socket body 16 of a synthetic resin formed (or molded) integrally with a flange 17 and a connector housing 18, and retaining projections 16*a* for retaining engagement with the lamp body 2 are formed on a peripheral (or side) surface of the socket body 16. Three (three kinds of) connection terminals 19, 22 and 24 are received in the socket body 16. The connection terminal 19 has a connector terminal 20 and a resilient conductor contact portion 19*c* formed at one end thereof. When the connection terminal 19 is received in the socket body 16, the connector terminal 20 projects into the interior of the connector housing 18, and the conductor contact portion 19*c* projects from the socket body 16 so as to be connected to the conductor W2. The connection terminal 19 also has a retaining portion 19*a* and a lamp connection portion 19*b* formed at the other end thereof. When the lamp L2 is inserted into the lamp socket 15, the retaining portion 19*a* retains the lamp L2, and the lamp connection portion 19*b* is electrically connected to the lamp L2.

The connection terminal 22 includes a pair of lamp connection portions 22*a* and 22*a* for connection to the lamp L2, and a conductor contact portion 22*b* for connection to the conductor W3.

The connection terminal 24 includes a retaining portion 24*a* for retaining the lamp L2, a lamp connection portion 24*b*, and a conductor contact portion 24*c* for connection to the grounding conductor G.

Figure 4:
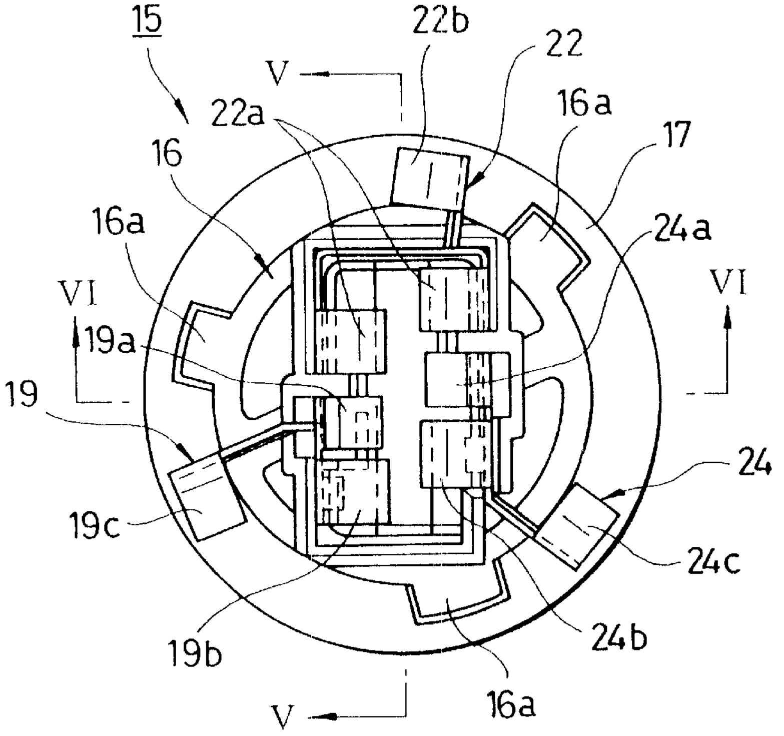
FIG. 4 is a plan view of the lamp socket of FIG. 3 having connection terminals inserted therein.

When the three connection terminals 19, 22 and 24 are received in the socket body 16 as shown in FIG. 4, the conductor contact portions 19*c*, 22*b* and 24*c* of these connection terminals project from the socket body 16, and are held against the surface of the flange 17.

Figure 5:
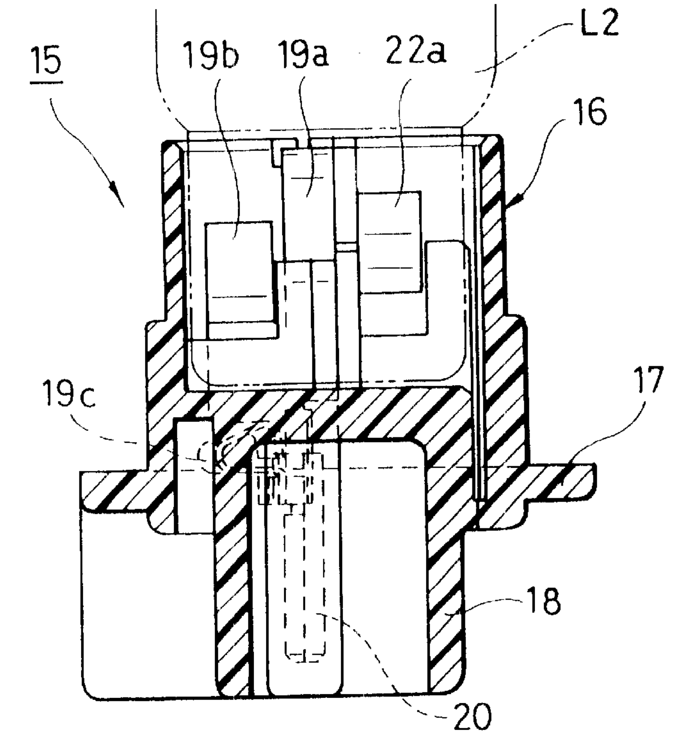
FIG. 5 is a cross-sectional view taken along the line V—V of FIG. 4.
Figure 6:
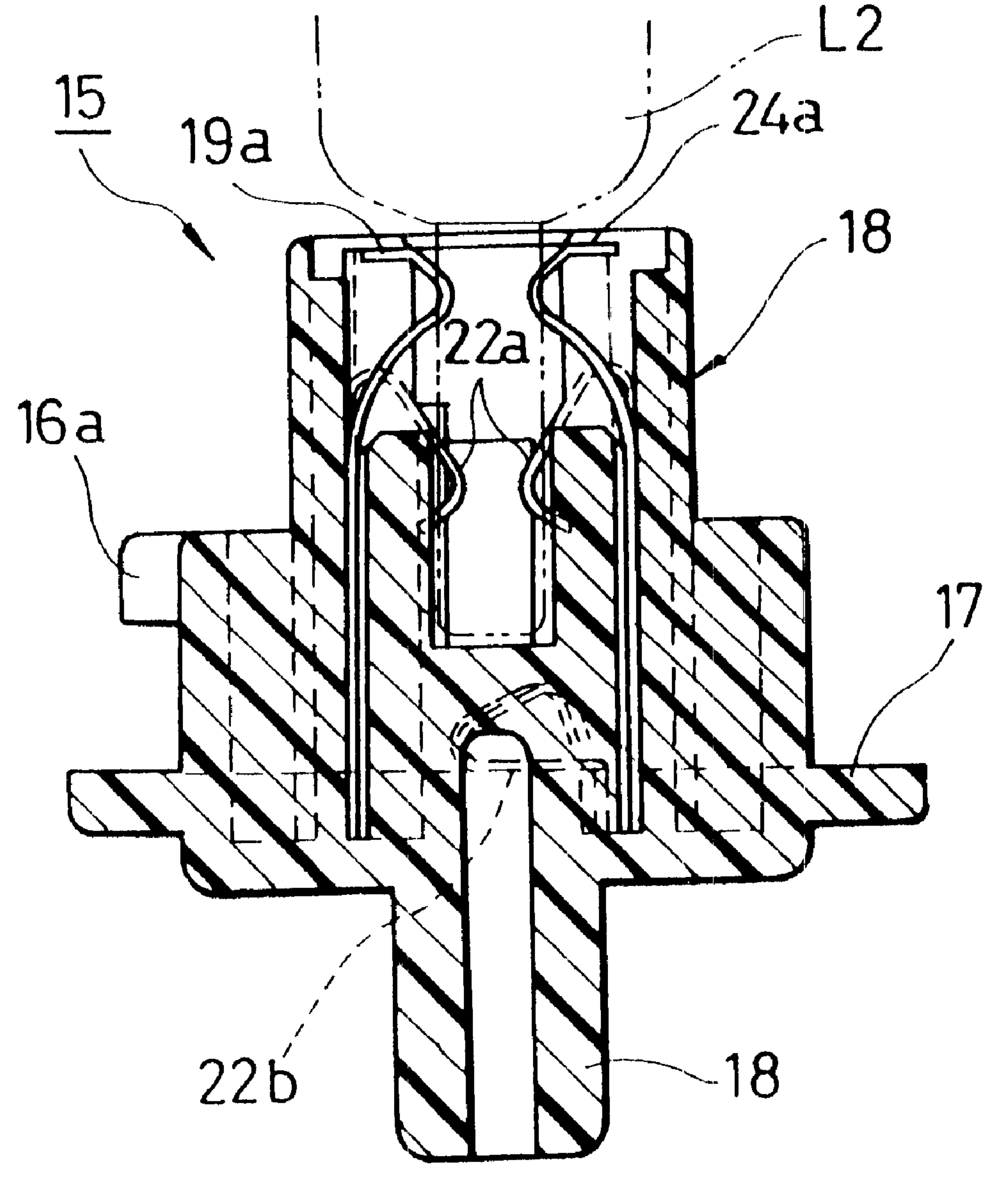
FIG. 6 is a cross-sectional view taken along the line VI—VI of FIG. 4.

At this time, the connector terminal 20 of the connection terminal 19 projects into the interior of the connector housing 18 as shown in FIG. 5, and the lamp L2, when inserted into the lamp socket 15 as shown in FIG. 6, is retained by the retaining portions 19*a* and 24*a*, and is electrically connected to the lamp connection portions 22*a*, 22*a*, 19*b* and 24*b* (see FIG. 3).

Figure 7:
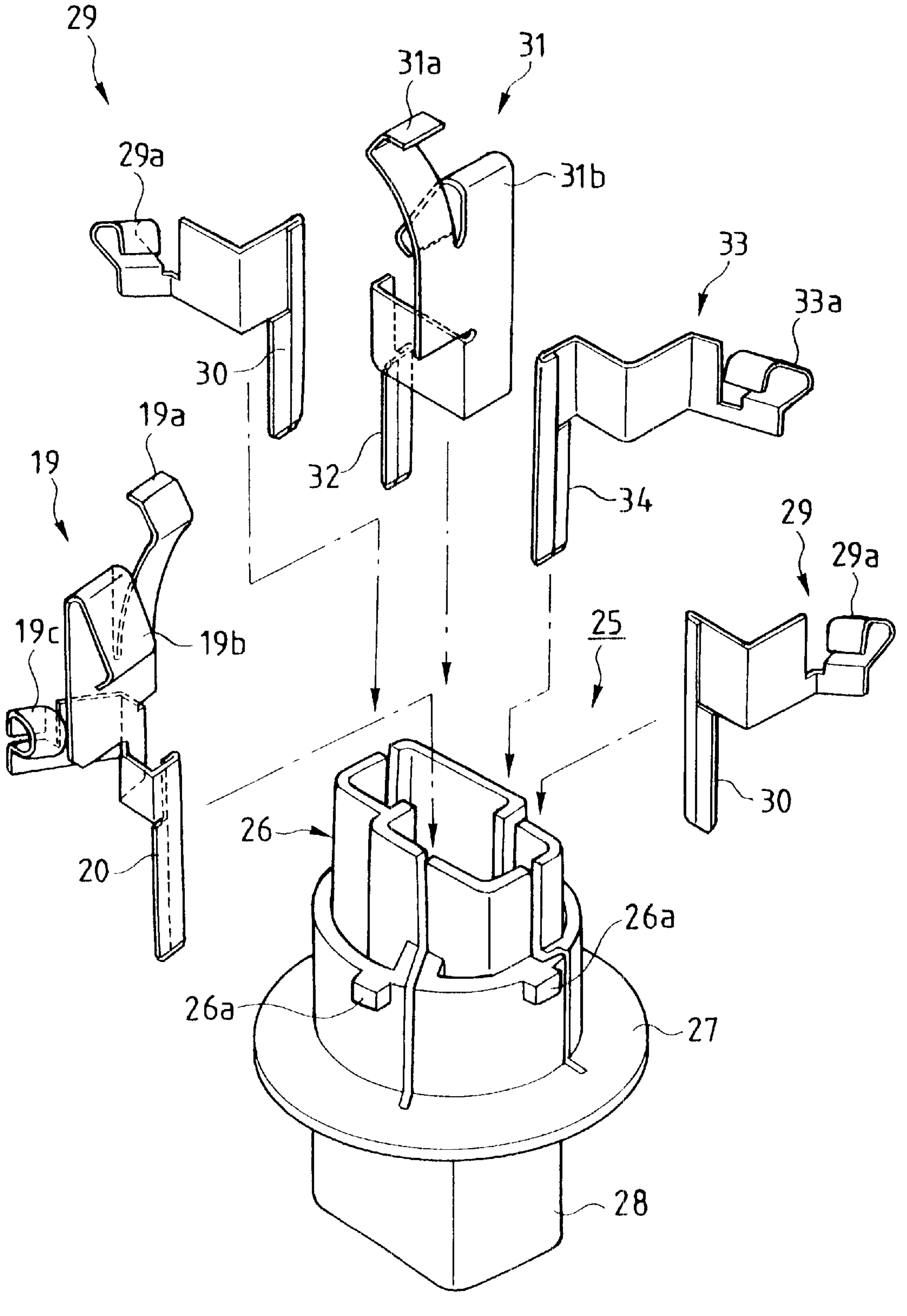
FIG. 7 is an exploded, perspective view of a second lamp socket in FIG. 1.

As shown in FIG. 7, the second lamp socket 25 is mounted on the central one among the three socket mounting portions 3 shown in FIG. 1, and a lamp L1, having one filament, is inserted into this second lamp socket 25. This lamp L1 serves as a turn lamp or a back lamp. This lamp socket 25 includes a socket body 26 of a synthetic resin formed (or molded) integrally with a flange 27 and a connector housing 28, and retaining projections 26*a* for retaining engagement with the lamp body 2 are formed on a peripheral (or side) surface of the socket body 26. Five (four kinds of) connection terminals 19, 29, 29, 31 and 33 are received in the socket body 26.

The two connection terminals 29 are mounted respectively at opposed portions of the socket body 26, and each of the connection terminals 29 includes a connector terminal 30 formed at one end thereof, and a resilient conductor contact portion 29*a* formed at the other end thereof. When the two connection terminal 29 are received in the socket body 26, their respective connector terminals 30 project into the interior of the connector housing 28, and their respective conductor contact portions 29*a* project from the socket body 26 so as to be connected respectively to the conductor W3 and the grounding conductor G.

The connection terminal 31 includes a connector terminal 32 formed at one end thereof, and also includes a retaining portion 31*a* and a lamp connection portion 31*b* formed at the other end thereof. The connector terminal 32 projects into the interior of the connector housing 28, and when the lamp L1 is inserted into the lamp socket 25, the retaining portion 31*a* retains the lamp L1, and the lamp connection portion 31*b* is electrically connected to the lamp L1.

The connection terminal 33 includes a connector terminal 34 formed at one end thereof, and a resilient conductor contact portion 33*a* formed at the other end thereof. The connector terminal 34 projects into the interior of the connector housing 28, and the conductor contact portion 33*a* projects from the socket body 26 so as to be connected to the conductor W1. The connection terminal 19, having a resilient conductor contact portion 19*c* for connection to the conductor W2, is the same as the above-mentioned connection terminal 19 inserted in the first lamp socket 15, and therefore explanation thereof will be omitted here.

Figure 8:
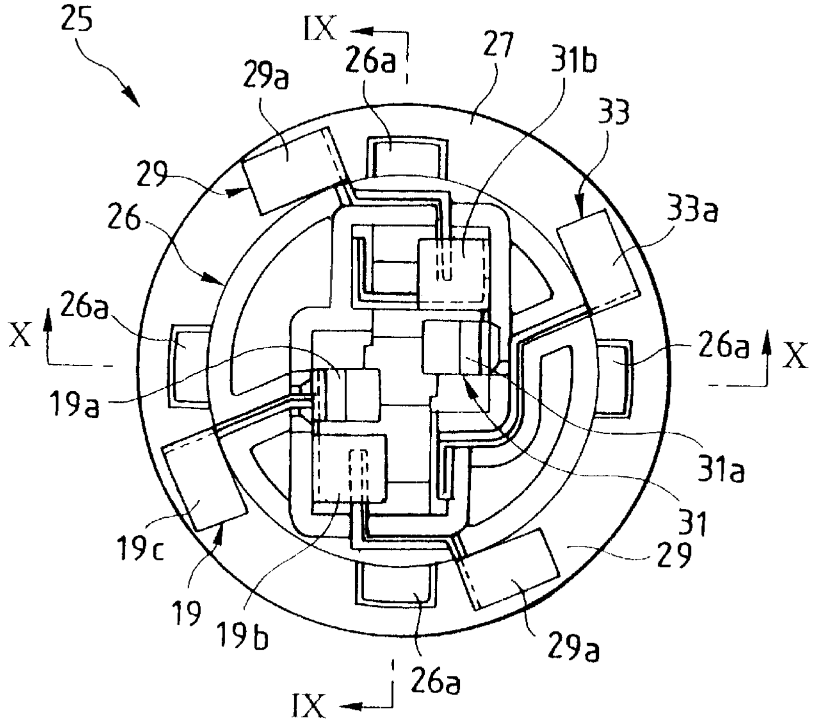
FIG. 8 is a plan view of the lamp socket of FIG. 7 having connection terminals inserted therein.

When the five connection terminals 19, 29, 29, 31 and 33 are received in the socket body 26 as shown in FIG. 8, the conductor contact portions 19*c*, 29*a*, 29*a* and 33*a* project from the socket body 26, and are held against the surface of the flange 27.

Figure 9:
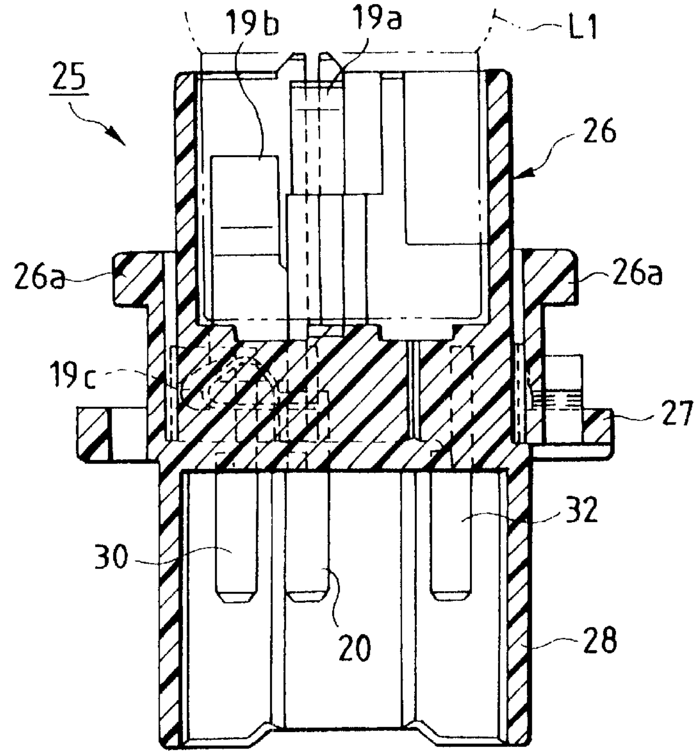
FIG. 9 is a cross-sectional view taken along the line IX—IX of FIG. 8.
Figure 10:
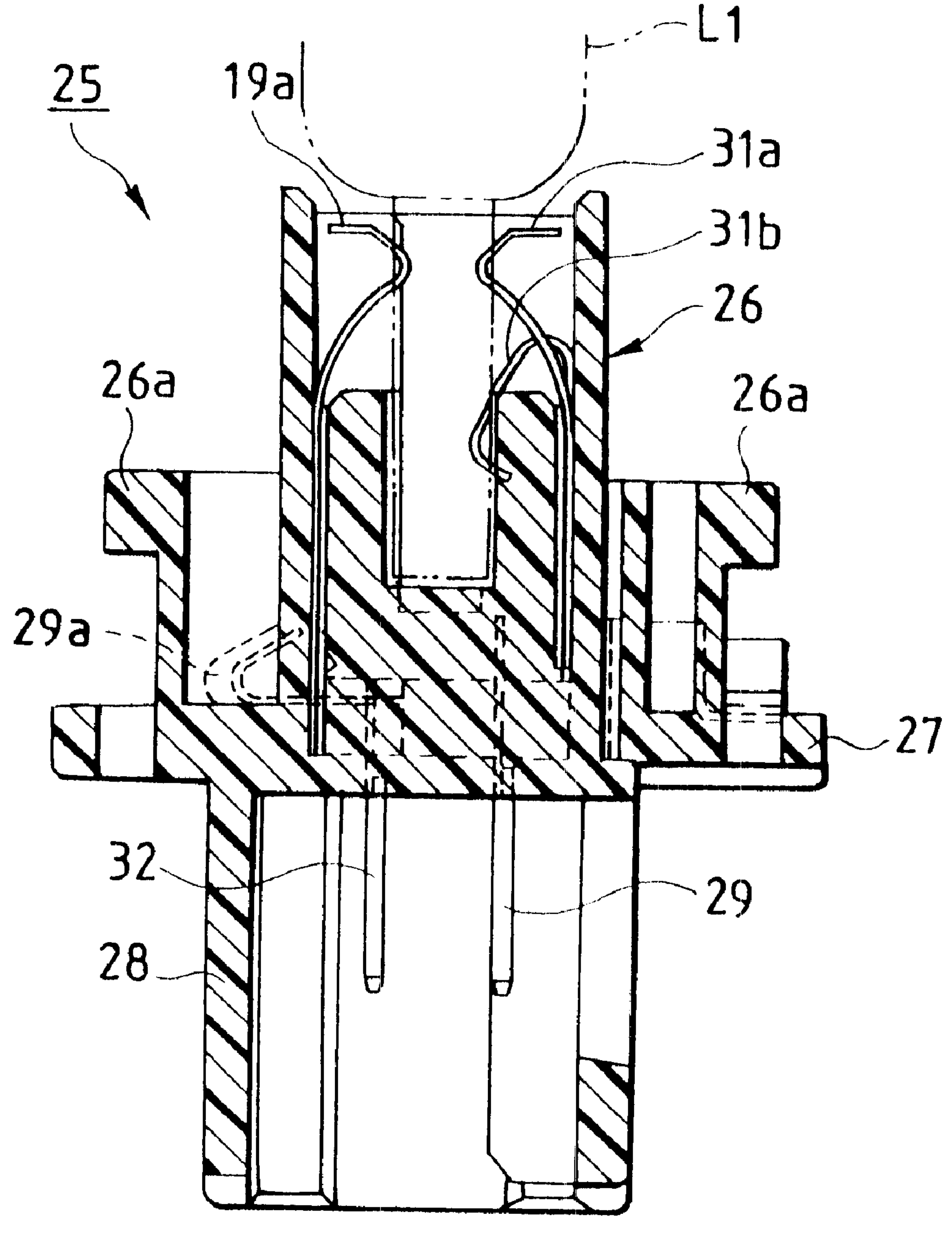
FIG. 10 is a cross-sectional view taken along the line X—X of FIG. 8.

At this time, the connector terminals 20, 30, 30, 32 and 34 of the connection terminals 19, 29, 29, 31 and 33 project into the interior of the connector housing 28 as shown in FIGS. 9 and 10, and the lamp L1, when inserted into the lamp socket 25, is retained by the retaining portions 19*a* and 31*a*, and is electrically connected to the lamp connection portions 19*b* (see FIG. 7) and 31*b*.

Figure 11:
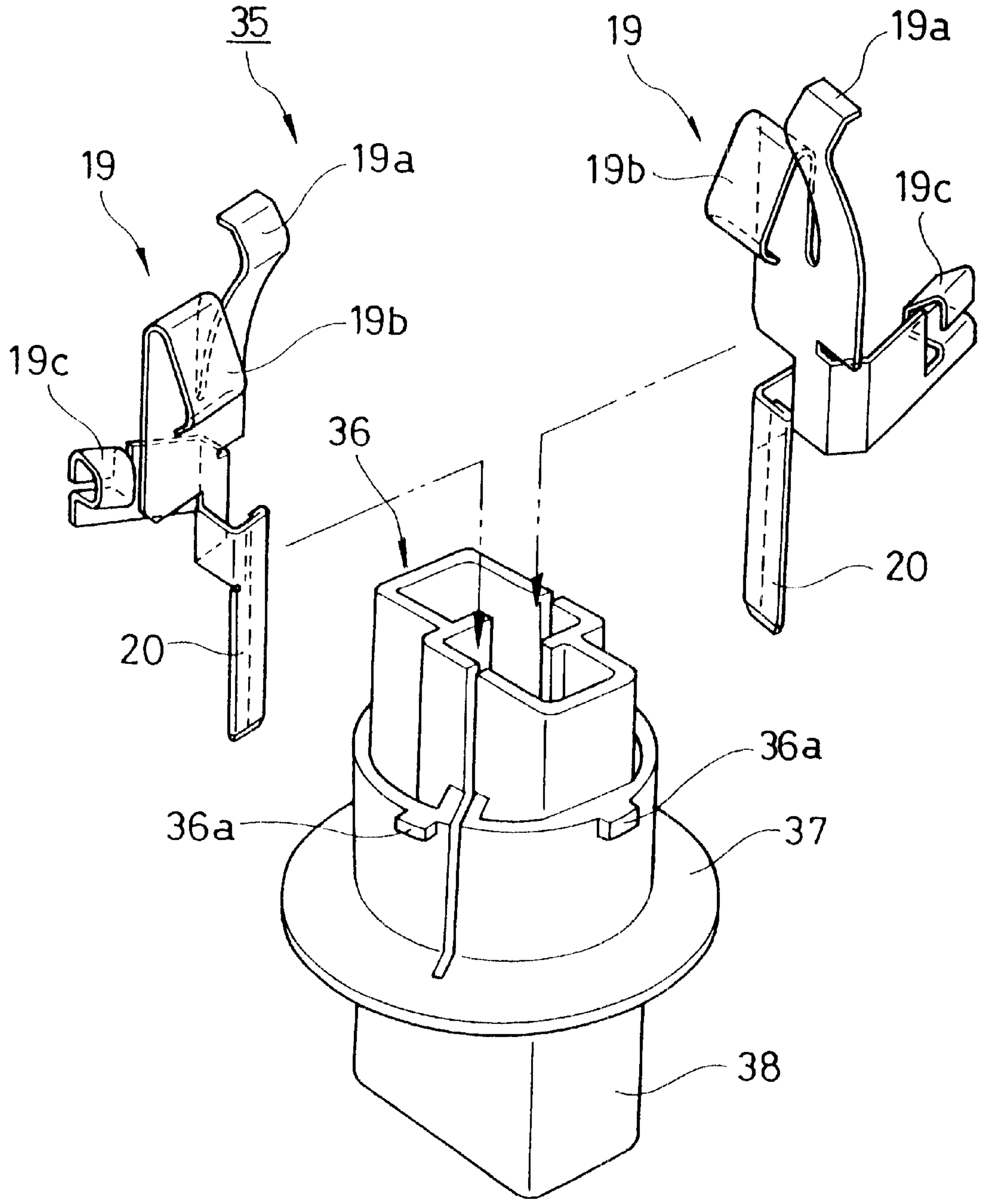
FIG. 11 is an exploded, perspective view of a third lamp socket in FIG. 1.

As shown in FIG. 11, the third lamp socket 35 is mounted on the left-hand one among the three socket mounting portions 3 shown in FIG. 1, and a lamp L1, having one filament, is inserted into this third lamp socket 35. This lamp L1 serves as a back lamp or a turn lamp. This lamp socket 35 includes a socket body 36 of a synthetic resin formed (or molded) integrally with a flange 37 and a connector housing 38, and retaining projections 36*a* for retaining engagement with the lamp body 2 are formed on a peripheral (or side) surface of the socket body 36. Two (one kind of) connection terminals 19 and 19 are received in the socket body 36. The two connection terminals 19, having respective resilient conductor contact portions 19*c* for connection respectively to the conductor W1 and the grounding conductor G, are the same as the above-mentioned connection terminals 19 inserted respectively in the first and second lamp sockets 15 and 25, and therefore explanation thereof will be omitted here.

Figure 12:
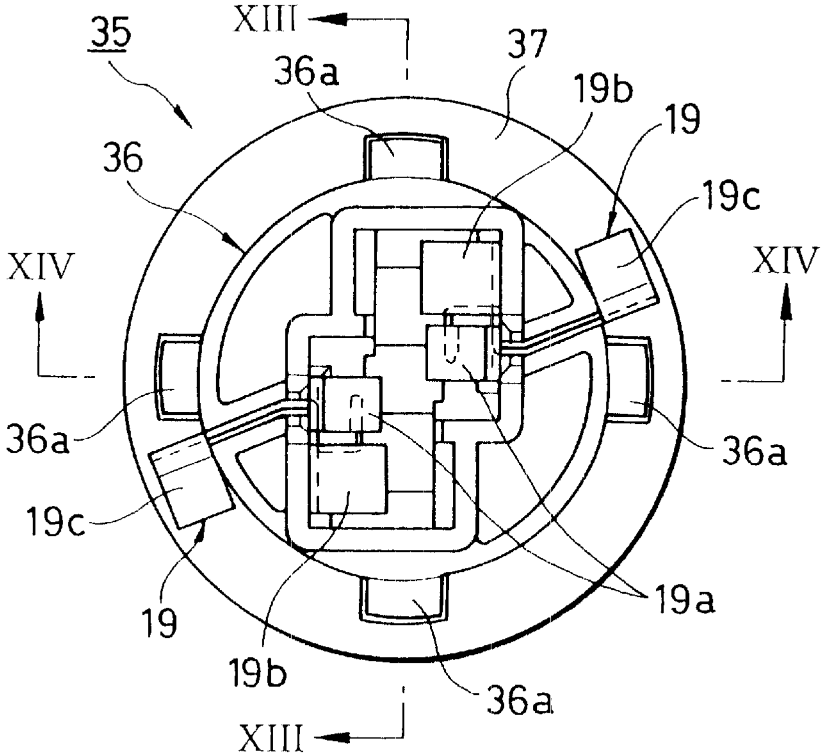
FIG. 12 is a plan view of the lamp socket of FIG. 11 having connection terminals inserted therein.

When the two connection terminals 19 and 19 are received in the socket body 36 as shown in FIG. 12, their respective conductor contact portions 19*c* and 19*c* project from the socket body 36, and are held against the surface of the flange 37.

Figure 13:
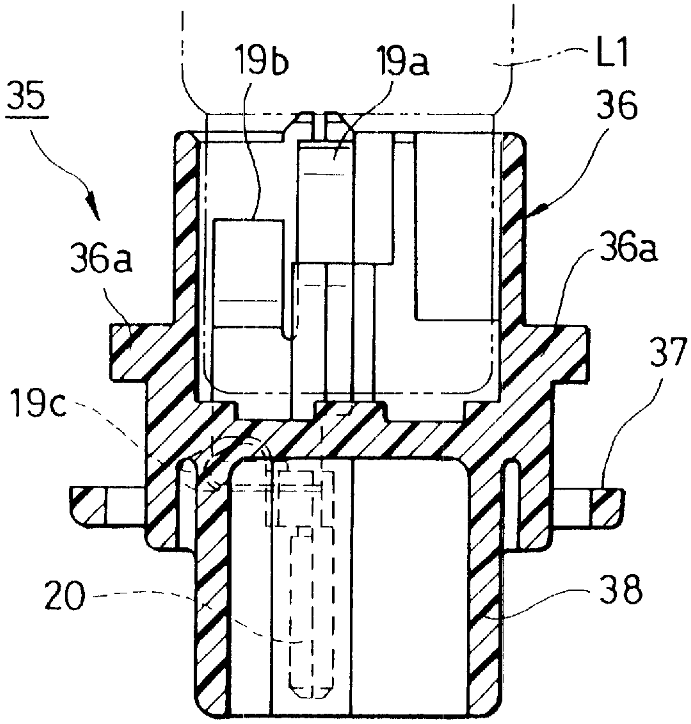
FIG. 13 is a cross-sectional view taken along the line XIII—XIII of FIG. 12.
Figure 14:
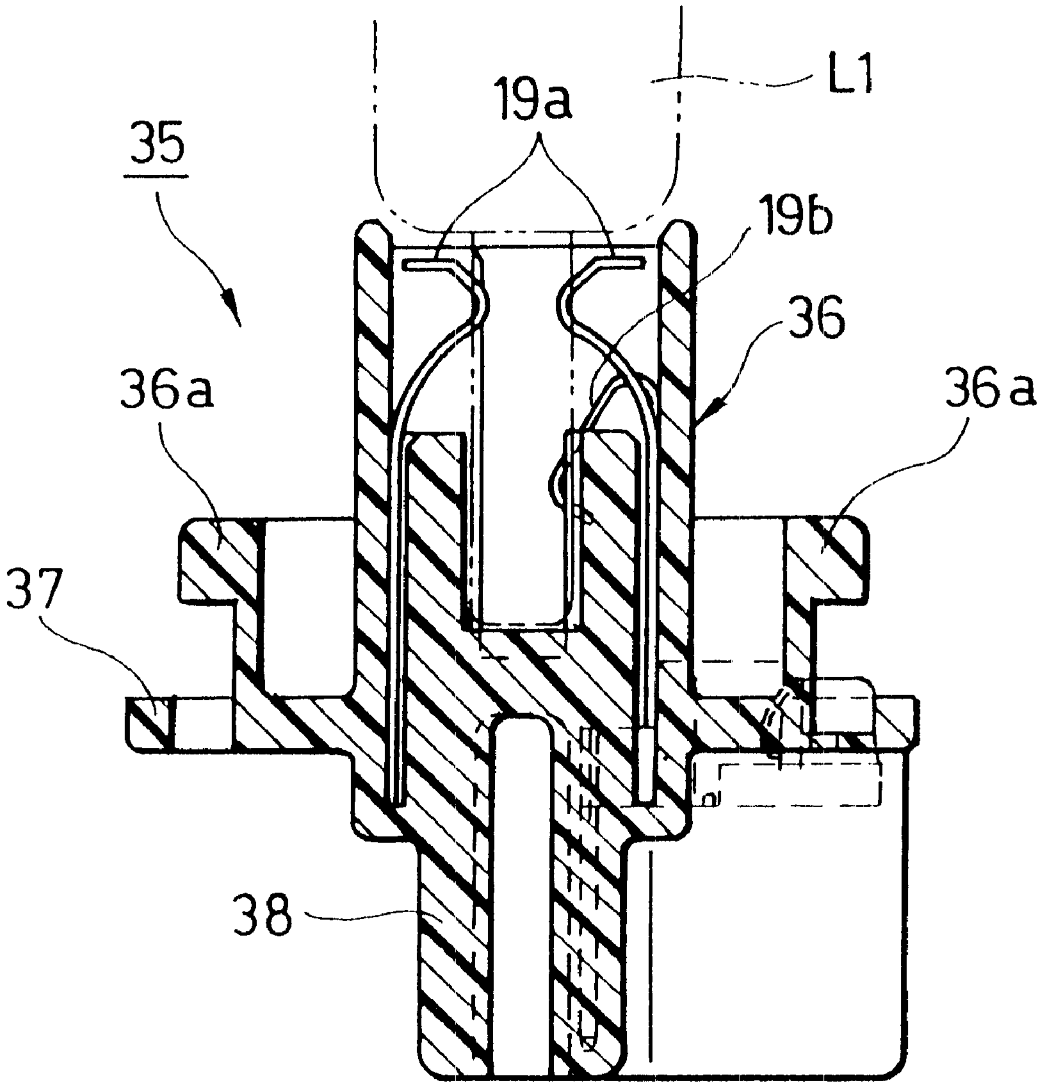
FIG. 14 is a cross-sectional view taken along the line XIV—XIV of FIG. 12.

At this time, as shown in FIGS. 13 and 14, connector terminals 20 and 20 of the two connection terminals 19 and 19 project into the interior of the connector housing 38, and the lamp L2, when inserted into the lamp socket 35, is retained by the retaining portions 19*a* and 19*a*, and is electrically connected to lamp connection portions 19*b* and 19*b* (see FIG. 11).

Figure 15:
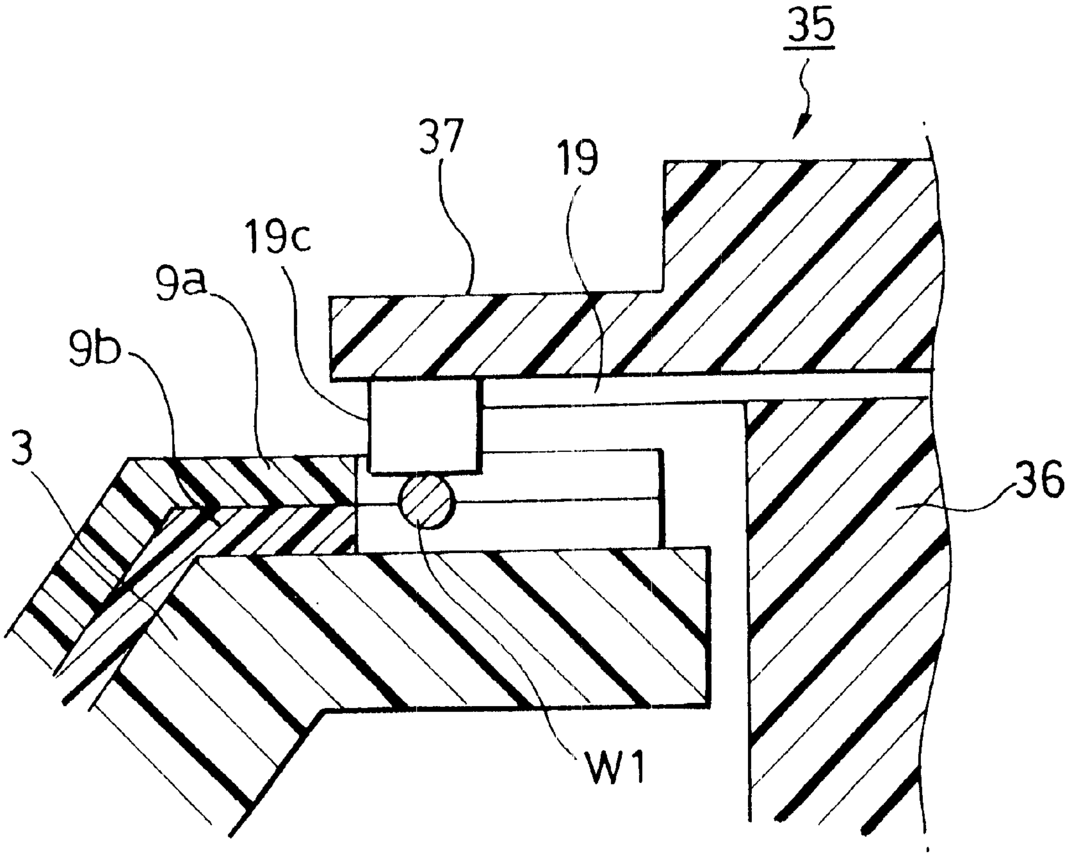
FIG. 15 is a cross-sectional view taken along the line XV—XV of FIG. 1.
Figure 16:
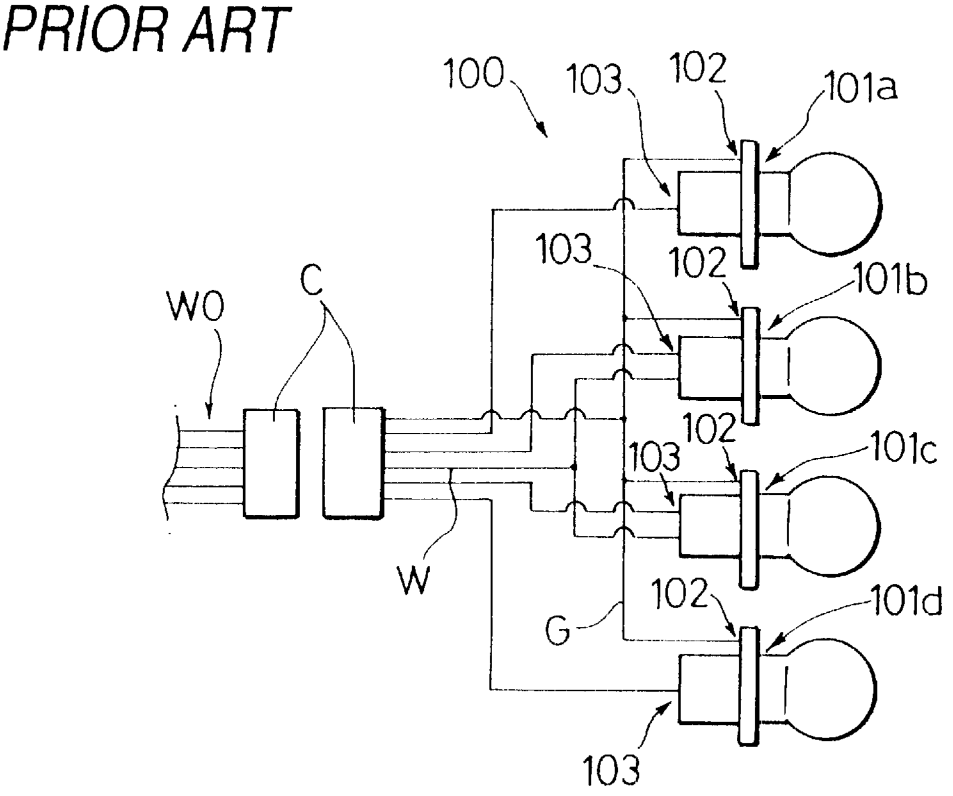
FIG. 16 PRIOR ART
FIG. 16 is a schematic view showing a conventional rear combination lamp.
Figure 17:
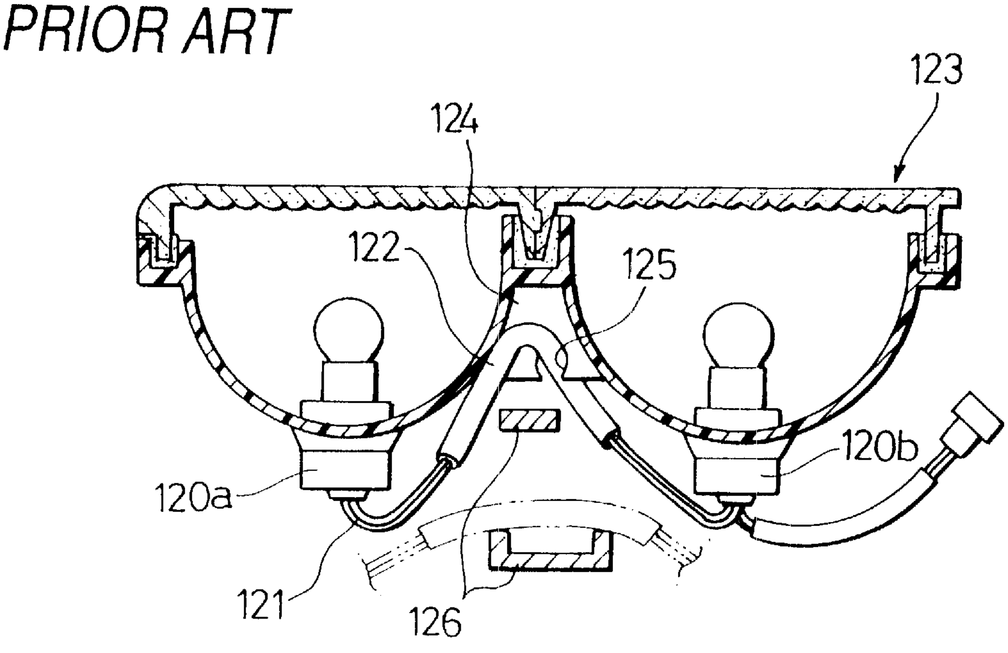
FIG. 17 PRIOR ART
FIG. 17 is a cross-sectional view of another conventional rear combination lamp.

For assembling the rear combination lamp 1 comprising the above constituent elements, the plate-like member 8 is first fitted and mounted on the lamp body 2 shown in FIG. 2. Then, the lamp sockets 15, 25 and 35 are passed respectively through the holes 10 in the plate-like member 8, and are mounted respectively in the socket mounting openings 5 in the lamp body 2. At this time, the conductor contact portions 19*c*, 22*b*, 24*c*, 29*a* and 33*a* of the connection terminals 19, 22, 24, 29 and 33, projecting from the flanges 17, 27 and 37 of the lamp sockets 15, 25 and 35 (shown respectively in FIGS. 4, 8 and 12), are abutted respectively against those portions of the conductors W1, W2, W3 and G (see FIG. 15 showing the third lamp socket) exposed respectively at the notches 11 formed in the peripheral edges of the holes 10 in the plate-like member 8 (shown in FIG. 1), thereby forming a predetermined circuit.

Then, mating connectors (not shown), connected to a power source, are fitted respectively into the connector housings 18, 28 and 38 of the lamp sockets 15, 25 and 35, thus achieving the electrical connection of the three lamps L1, L1 and L2.

In the rear combination lamp of this embodiment, the plate-like member 8 is formed by laying the conductors W1, W2, W3 and G, each having no sheath, on the flat thermoplastic resin sheet 9*a* having the hot-melt adhesive coated thereon.

Since the conductors W1, W2, W3 and G are thus arranged between the flat hot-melt sheets 9*a* and 9*b*, the operation for arranging the conductors W1, W2, W3 and G is simplified, and this wire-arranging operation can be easily automated.

And besides, the branch connections of the conductors W1, W2, W3 and G can be easily effected, and a desired circuit can be formed on the hot-melt sheet 9*a*. Since the conductors W1, W2, W3 and G are sandwiched or held between the hot-melt sheets 9*a* and 9*b*, a conductor installation operation is not necessary.

The plate-like member 8 is vacuum formed into such a shape as to be fitted on the socket mounting portions 3, and therefore the positioning of the plate-like member 8 relative to the lamp body 2 can be easily effected when mounting the plate-like member 8 on the lamp body 2. And besides, in a heated condition of the hot-melt sheets 9*a* and 9*b*, the laying of the conductors W1, W2, W3 and G on the hot-melt sheet 9*a* and the vacuum forming of the hot-melt sheets 9*a* and 9*b* can be effected at the same time, and therefore the productivity can be enhanced.

The conductors W1, W2, W3 and G, each having no sheath, are arranged or mounted in the plate-like member 8 in such a manner that the predetermined portions of these conductors are exposed at the notches 11, respectively, and the conductor contact portions 19*c*, 22*b*, 24*c*, 29*a* and 33*a* of the connection terminals 19, 22, 24, 29 and 33 are projected from the flanges 17, 27 and 37 of the lamp sockets 15, 25 and 35. With this construction, the lamp sockets 15, 25 and 35 can be easily mounted respectively on the socket portions 3 through the respective holes 10 in the plate-like member 8.

Therefore, the conductor contact portions 19*c*, 22*b*, 24*c*, 29*a* and 33*a* can be automatically abutted respectively against the exposed portions of the conductors W1, W2, W3 and G, and therefore the efficiency of the assembling operation can be enhanced.

And besides, the direction of mounting of the plate-like member 8 on the lamp body 2 is the same as the direction of mounting of the lamp sockets 15, 25 and 35 on the lamp body 2, and therefore an automatic assembling machine of a compact construction for the rear combination lamp 1 can be designed.

The rear combination lamp of the present invention is not limited to the above embodiment, but suitable modifications can be made. For example, although the wire-like conductors are mounted in the plate-like member, plate-like conductors can be used.

Although the vacuum forming method is used for forming or shaping the hot-melt adhesive-coated, thermoplastic resin sheets in such a manner that these sheets can fit on at least part of the lamp body, these sheets can be shaped by pressing.

As described above, in the rear combination lamp of the present invention, the conductors are mounted in the plate-like member, having the holes corresponding respectively to the socket mounting openings, thereby forming the predetermined circuit, and each of the connection terminals has the conductor contact portion, and the plate-like member is mounted on the lamp body, and the lamp sockets are passed respectively through the holes in the plate-like member, and are mounted respectively in the socket mounting openings, so that the conductor contact portions of the connection terminals are contacted with the associated conductors, respectively, thereby electrically connecting the lamps to the conductors.

Therefore, the conductors are mounted in a flat manner in the plate-like member, and therefore the conductor-mounting operation can be easily automated, and also branch connections of the conductors can be easily effected. And besides, since the conductors are mounted in the plate-like member, a wire installation operation is not necessary, and therefore the assembling operation of the rear combination lamp is simplified, and this assembling operation can be easily automated.

In the rear combination lamp, the plate-like member is so shaped as to be fitted on at least part of the lamp body, and therefore the operation for mounting the plate-like member on the lamp body can be effected easily and positively, and the productivity can be enhanced.

In the rear combination lamp, the plate-like member comprises the thermoplastic resin sheets each having the hot-melt adhesive coated thereon. Therefore, in a heated condition of the sheets, the operation for mounting the conductors and the operation for forming the sheet into such a shape as to be fitted on at least part of the lamp body can be effected at the same time, and therefore the productivity can be further enhanced.

In the rear combination lamp, each of the lamp sockets includes the socket body, receiving the connection terminals, and the flange, and the conductor contact portion of each of the connection terminals is resilient, and the conductor contact portion projects from the flange, and is abutted against the associated conductor. Therefore, when the lamp sockets are mounted on the lamp body through the respective holes in the plate-like member, the conductor contact portions of the connection terminals are automatically abutted respectively against the conductors in the plate-like member, and therefore the efficiency of the assembling operation can be enhanced.

What is claimed is:

1. A rear combination lamp, comprising:

a lamp;

a lamp socket holding the lamp, the lamp socket including a plurality of connection terminals which are electrically connected to the lamp;

a plurality of conductor contact portions respectively formed on the connection terminals;

a lamp body, comprising at least one socket mounting portion including a socket mounting opening, which is formed in a rear side of the socket mounting portion, and in which the lamp socket is detachably mounted; and a plate-like member including a hole corresponding to the socket mounting opening, the plate-like member being mounted on the lamp body, the plate-like member having a plurality of conductors mounted therein, wherein the lamp socket is mounted in the socket mounting opening through the hole of the plate-like member so that the conductor contact portions of the connection terminals are electrically connected respectively to the conductors of the plate-like member.

2. The rear combination lamp of claim 1, wherein the plate-like member is so shaped as to be fitted on at least part of the lamp body.

3. The rear combination lamp of claim 1, wherein the plate-like member comprises a thermoplastic resin sheet having a hot-melt adhesive.

4. The rear combination lamp of claim 2, wherein the plate-like member comprises a thermoplastic resin sheet having a hot-melt adhesive.

5. The rear combination lamp of claim 1, wherein the lamp socket includes:

a socket body receiving the connection terminals, and a flange, wherein the conductor contact portions of the connection terminals have resiliency, and project from the flange, and wherein when the lamp socket is mounted in the socket mounting opening, the conductor contact portions are abutted respectively against the conductors.

6. The rear combination lamp of claim 2, wherein the lamp socket includes:

a socket body receiving the connection terminals, and a flange, wherein the conductor contact portions of the connection terminals have resiliency, and project from the flange, and wherein when the lamp socket is mounted in the socket mounting opening, the conductor contact portions are abutted respectively against the conductors.

7. The rear combination lamp of claim 3, wherein the lamp socket includes:

a socket body receiving the connection terminals, and a flange, wherein the conductor contact portions of the connection terminals have resiliency, and project from the flange, and wherein when the lamp socket is mounted in the socket mounting opening, the conductor contact portions are abutted respectively against the conductors.

8. The rear combination lamp of claim 4, wherein the lamp socket includes:

a socket body receiving the connection terminals, and a flange, wherein the conductor contact portions of the connection terminals have resiliency, and project from the flange, and wherein when the lamp socket is mounted in the socket mounting opening, the conductor contact portions are abutted respectively against the conductors.

9. The rear combination lamp of claim 1, wherein the socket mounting portion is formed as a shaped surface of the lamp body, and wherein the plate-like member is so shaped as to cover the socket mounting portion.

10. The rear combination lamp of claim 2, wherein the socket mounting portion is formed as a shaped surface of the lamp body, and wherein the plate-like member is so shaped as to cover the socket mounting portion.

11. The rear combination lamp of claim 3, wherein the socket mounting portion is formed as a shaped surface of the lamp body, and wherein the plate-like member is so shaped as to cover the socket mounting portion.

12. The rear combination lamp of claim 4, wherein the socket mounting portion is formed as a shaped surface of the lamp body, and wherein the plate-like member is so shaped as to cover the socket mounting portion.

13. The rear combination lamp of claim 5, wherein the socket mounting portion is formed as a shaped surface of the lamp body, and wherein the plate-like member is so shaped as to cover the socket mounting portion.

14. The rear combination lamp of claim 6, wherein the socket mounting portion is formed as a shaped surface of the lamp body, and wherein the plate-like member is so shaped as to cover the socket mounting portion.

15. The rear combination lamp of claim 7, wherein the socket mounting portion is formed as a shaped surface of the lamp body, and wherein the plate-like member is so shaped as to cover the socket mounting portion.

16. The rear combination lamp of claim 8, wherein the socket mounting portion is formed as a shaped surface of the lamp body, and wherein the plate-like member is so shaped as to cover the socket mounting portion.

17. The rear combination lamp of claim 1, wherein the plate-like member comprises two thermoplastic resin sheets having a hot-melt adhesive therebetween, the thermoplastic resin sheets are adhesively bonded together while the conductors are sandwiched therebetween.

18. The rear combination lamp of claim 2, wherein the plate-like member comprises two thermoplastic resin sheets having a hot-melt adhesive therebetween, the thermoplastic resin sheets are adhesively bonded together while the conductors are sandwiched therebetween.

19. The rear combination lamp of claim 5, wherein the plate-like member comprises two thermoplastic resin sheets having a hot-melt adhesive therebetween, the thermoplastic resin sheets are adhesively bonded together while the conductors are sandwiched therebetween.

20. The rear combination lamp of claim 6, wherein the plate-like member comprises two thermoplastic resin sheets having a hot-melt adhesive therebetween, the thermoplastic resin sheets are adhesively bonded together while the conductors are sandwiched therebetween.

21. The rear combination lamp of claim 7, wherein the plate-like member comprises two thermoplastic resin sheets having a hot-melt adhesive therebetween, the thermoplastic resin sheets are adhesively bonded together while the conductors are sandwiched therebetween.

22. The rear combination lamp of claim 8, wherein the plate-like member comprises two thermoplastic resin sheets having a hot-melt adhesive therebetween, the thermoplastic resin sheets are adhesively bonded together while the conductors are sandwiched therebetween.

23. The rear combination lamp of claim 1, wherein the conductors are partially exposed at notches which are formed in the plate-like member, so that the conductor contact portions of the connection terminals are electrically connected respectively to partially-exposed portions of the conductors at the notches of the plate-like member when the lamp socket is mounted in the socket mounting opening.

* * * * *